United States Patent
Lee et al.

(10) Patent No.: US 12,220,980 B2
(45) Date of Patent: Feb. 11, 2025

(54) BATTERY CASE STRUCTURE FOR ELECTRIC VEHICLE

(71) Applicants: Hyundai Motor Company, Seoul (KR); Kia Corporation, Seoul (KR)

(72) Inventors: Kang Won Lee, Seongnam-Si (KR); So Young Jo, Seoul (KR); Jeong Hun Seo, Suwon-Si (KR); In Gook Son, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 306 days.

(21) Appl. No.: 17/895,816

(22) Filed: Aug. 25, 2022

(65) Prior Publication Data
US 2023/0226898 A1    Jul. 20, 2023

(30) Foreign Application Priority Data
Jan. 20, 2022 (KR) .......................... 10-2022-0008656

(51) Int. Cl.
*B60K 1/04*      (2019.01)
*B60L 50/60*     (2019.01)
*B62D 21/15*     (2006.01)

(52) U.S. Cl.
CPC ............... *B60K 1/04* (2013.01); *B60L 50/66* (2019.02); *B62D 21/157* (2013.01); *B60K 2001/0438* (2013.01)

(58) Field of Classification Search
CPC ... B60K 1/04; B60K 2001/0438; B60L 50/66; B60L 50/64; B62D 21/157; B62D 25/2036; B62D 25/20; B62D 25/2009; H01M 50/20; H01M 50/24; H01M 50/242; H01M 50/249; H01M 2220/20
See application file for complete search history.

(56) References Cited

U.S. PATENT DOCUMENTS

| | | | | |
|---|---|---|---|---|
| 8,210,603 B2 * | 7/2012 | Favaretto | ............ | B62D 27/065 296/29 |
| 8,702,161 B2 * | 4/2014 | Charbonneau | ....... | B62D 21/157 296/187.12 |
| 9,505,442 B2 | 11/2016 | Wu et al. | | |
| 10,259,506 B2 * | 4/2019 | Ayukawa | ............. | B62D 25/025 |

(Continued)

FOREIGN PATENT DOCUMENTS

| | | | | |
|---|---|---|---|---|
| AT | 521849 A1 * | 5/2020 | ............... | B60K 1/04 |
| CN | 113135234 A * | 7/2021 | ............... | B60K 1/04 |

(Continued)

OTHER PUBLICATIONS

Translated copy of AT-521849-A1 (Year: 2024).*

*Primary Examiner* — James A Shriver, II
*Assistant Examiner* — Ian Bryce Shelton
(74) *Attorney, Agent, or Firm* — Morgan, Lewis & Bockius LLP

(57) ABSTRACT

A battery case structure for an electric vehicle, includes a side member in which a flange of the side member laterally provided in a battery case is deformed or broken from a partition to absorb an impact when a side collision occurs, minimizing the impact which is caused by the collision and is provided to penetrate into a battery. Furthermore, the partition of the side member is designed based on topology optimization to secure rigidity, protecting the battery against the impact.

13 Claims, 3 Drawing Sheets

(56) References Cited

U.S. PATENT DOCUMENTS

| | | | |
|---|---|---|---|
| 10,286,956 B2 | 5/2019 | Keuthage et al. | |
| 10,308,286 B2 | 6/2019 | Yang et al. | |
| 10,328,978 B2 | 6/2019 | Yang et al. | |
| 10,494,034 B2 | 12/2019 | Makowski et al. | |
| 10,661,841 B2 * | 5/2020 | Choi | B62D 29/002 |
| 10,668,957 B2 * | 6/2020 | Choi | B62D 25/2036 |
| 10,720,620 B1 * | 7/2020 | Grace | H01M 50/244 |
| 10,723,385 B2 * | 7/2020 | Ayukawa | B62D 25/2009 |
| 10,752,292 B2 * | 8/2020 | Kawase | B62D 21/157 |
| 10,780,926 B2 * | 9/2020 | Lee | B60K 1/04 |
| 10,926,804 B2 | 2/2021 | Yang et al. | |
| 10,938,007 B2 * | 3/2021 | Wesche | H01M 50/242 |
| 10,988,186 B2 | 4/2021 | Makowski et al. | |
| 11,383,766 B2 * | 7/2022 | Takahashi | B62D 27/02 |
| 11,772,473 B2 * | 10/2023 | Suewaka | H01M 6/5038 429/120 |
| 2012/0153682 A1 | 6/2012 | Rawlinson et al. | |
| 2015/0158532 A1 * | 6/2015 | Ayuzawa | B62D 25/20 296/193.07 |
| 2016/0236713 A1 * | 8/2016 | Sakaguchi | B62D 25/2036 |
| 2018/0312199 A1 * | 11/2018 | Kawase | B60K 1/04 |
| 2019/0210659 A1 * | 7/2019 | Choi | B60K 1/04 |
| 2022/0063389 A1 * | 3/2022 | Suewaka | H01M 50/204 |
| 2022/0320659 A1 * | 10/2022 | Munjurulimana | H01M 50/249 |

FOREIGN PATENT DOCUMENTS

| | | | | |
|---|---|---|---|---|
| DE | 102016115647 B3 | * | 12/2017 | B60K 1/04 |
| DE | 102017124018 A1 | * | 5/2018 | B62D 21/00 |
| DE | 102018109296 B3 | * | 9/2019 | |
| DE | 102018210121 A1 | * | 12/2019 | B60K 1/04 |
| EP | 2881308 A1 | | 6/2015 | |
| JP | 2008-149943 | | 7/2008 | |
| JP | 2008-174181 | | 7/2008 | |
| JP | 2017-193289 | | 10/2017 | |
| JP | 2021095116 A | * | 6/2021 | B60K 1/04 |
| KR | 20190078936 A | * | 7/2019 | |
| KR | 102027124 B1 | * | 10/2019 | |
| KR | 102344152 B1 | * | 1/2022 | |
| WO | WO-2021003299 A1 | * | 1/2021 | B60K 1/04 |

* cited by examiner

BATTERY CASE STRUCTURE FOR ELECTRIC VEHICLE

CROSS REFERENCE TO RELATED APPLICATION

The present application claims priority to Korean Patent Application No. 10-2022-0008656, filed Jan. 20, 2022, the entire contents of which is incorporated herein for all purposes by this reference.

BACKGROUND OF THE PRESENT DISCLOSURE

Field of the Present Disclosure

The present disclosure relates to a battery case structure for an electric vehicle, and more particularly, to a battery case structure for an electric vehicle, in which a battery is prevented from damage when a side collision occurs.

Description of Related Art

Recently, interest in eco-friendly vehicles has heightened due to environmental problems, high oil prices, etc., and electric vehicles using electrical energy to drive have been developed variously.

Such electric vehicles are being developed as battery-powered electric vehicles, fuel cell electric vehicles based on an electric motor powered by a fuel cell, hybrid electric vehicles based on the combination of an electric motor and an engine, and the like.

The electric vehicle is provided with a battery module for storing electrical energy, and the battery module includes a plurality of battery cell units accommodated in a battery housing. Such a battery module needs to prevent the battery cell units from being damaged by an external impact.

Conventionally, only a front-side member is configured to protect a high voltage battery mounted to a vehicle body floor against a front collision. However, only the front side member is not sufficient to protect the high voltage battery when a side collision occurs, and there is a problem in that the high voltage battery is damaged because the high voltage battery is directly impacted as a vehicle body is deformed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery case structure for an electric vehicle, which employs a system for absorbing an impact through a lateral side of a battery case when a side collision occurs, minimizing the impact penetrating a battery and preventing the battery from damage.

According to an exemplary embodiment of the present disclosure, a battery case structure for an electric vehicle, includes: a vehicle body floor panel including side sills at first and second lateral sides of the vehicle body floor panel; a battery case coupled to a lower portion of the vehicle body floor panel; and a side member including a partition coupled to each lateral side of the battery case, and a flange extending laterally from the partition and coupled to the side sills of the vehicle body floor panel, the partition being internally formed with at least one rib extending transversely.

The partition and the flange of the side member may be shaped like boxes including a closed cross-section, the battery case may be provided at an inward side of the partition, and the flange may be coupled as biased downwards to an outward side of the partition.

The battery case structure may further include a first rib formed inside the partition and extending as inclined upwards from a region of the outward side, to which an upper portion of the flange is connected, to the inward side of the partition.

The battery case structure may further include a second rib formed inside the partition and extending as inclined upwards from the first rib on the inward side to the outward side of the partition.

The battery case structure may further include a third rib formed inside the partition and extending as inclined upwards from a region of the outward side, to which a lower portion of the flange is connected, to the inward side of the partition.

The battery case structure may further include a supporter formed in a lower portion of the partition and protrudes from the inward side toward the battery case.

The supporter may be positioned so that a lateral portion of the battery case is accommodated thereon and include an upper portion connected matching the third rib and a lower portion connected matching the bottom portion of the partition.

The battery case structure may further include a fifth rib formed inside the partition and connecting the inward side and the bottom portion.

The battery case structure may further include: a sixth rib formed inside the flange and extending to traverse the flange laterally, and a fourth rib formed inside the partition and extending collinearly as the sixth rib.

The sixth rib may be laterally extending across the inside of the flange to divide the inside of the flange into an upper space and a lower space, and positioned so that the upper space is formed to have a smaller vertical height than a vertical height of the lower space.

The battery case structure may further include a seventh rib formed inside the flange and extending to vertically traverse the inside of the flange, the seventh rib being positioned in a region to which the side sills of the vehicle body floor panel is connected.

With the foregoing structure of the battery case for the electric vehicle, the flange of the side member laterally provided in the battery case is deformed or broken from the partition to absorb an impact when a side collision occurs, minimizing the impact which is caused by the collision and is provided to penetrate the battery. Furthermore, the partition of the side member is designed based on the topology optimization to secure rigidity, protecting the battery against the impact.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
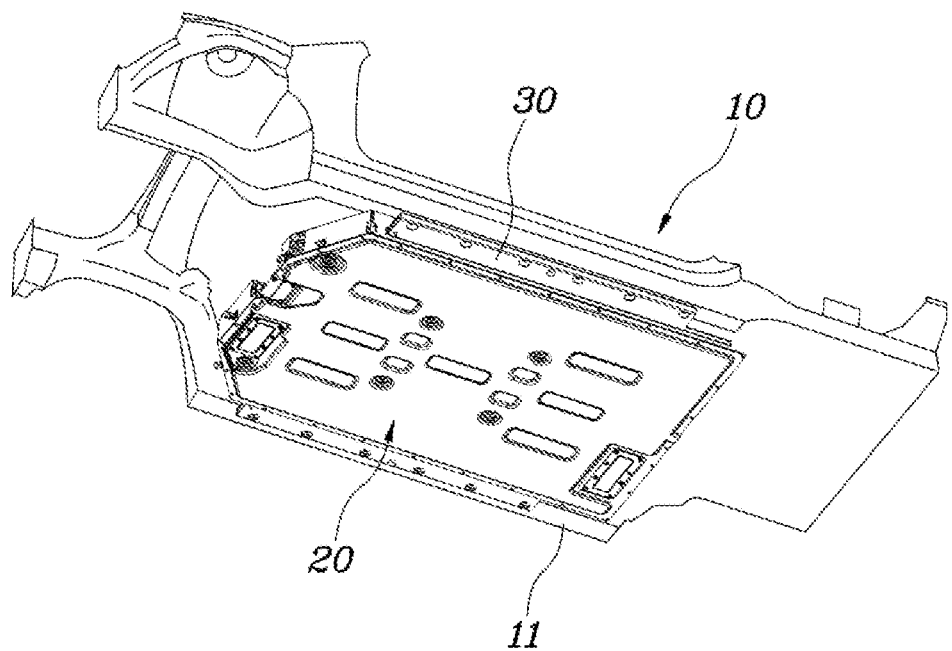
FIG. 1 is a view exemplarily illustrating a vehicle body floor and a battery case according to the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a battery case structure for an electric vehicle according to various exemplary embodiments of the present disclosure will be described with reference to the accompanying drawings.

Regarding embodiments of the present disclosure included in the exemplary embodiment or application, the specific structural or functional description is merely illustrative for describing the exemplary embodiments of the present disclosure, and embodiments of the present disclosure may be implemented in various forms but not be construed as being limited to the exemplary embodiments set forth in the exemplary embodiment or application.

Because the exemplary embodiments of the present disclosure may be variously modified and have various forms, specific exemplary embodiments will be illustrated in the drawings and described in detail in the exemplary embodiment or application. However, it should be understood that embodiments of the present disclosure are intended not to be limited to the specific embodiments but to cover all modifications, equivalents or alternatives without departing from the spirit and technical scope of the present disclosure.

Unless defined otherwise, all terms used herein including technical or scientific terms have the same meanings as those generally understood by a person having ordinary knowledge in the art to which the present disclosure pertains. The terms such as those defined in generally used dictionaries are construed to have meanings matching that in the context of related technology, and unless clearly defined otherwise, are not construed to be ideally or excessively formal.

Below, the present disclosure will be described in detail by describing embodiments with reference to the accompanying drawings. Like reference numerals in the drawings refer to like numerals.

Figure 2:
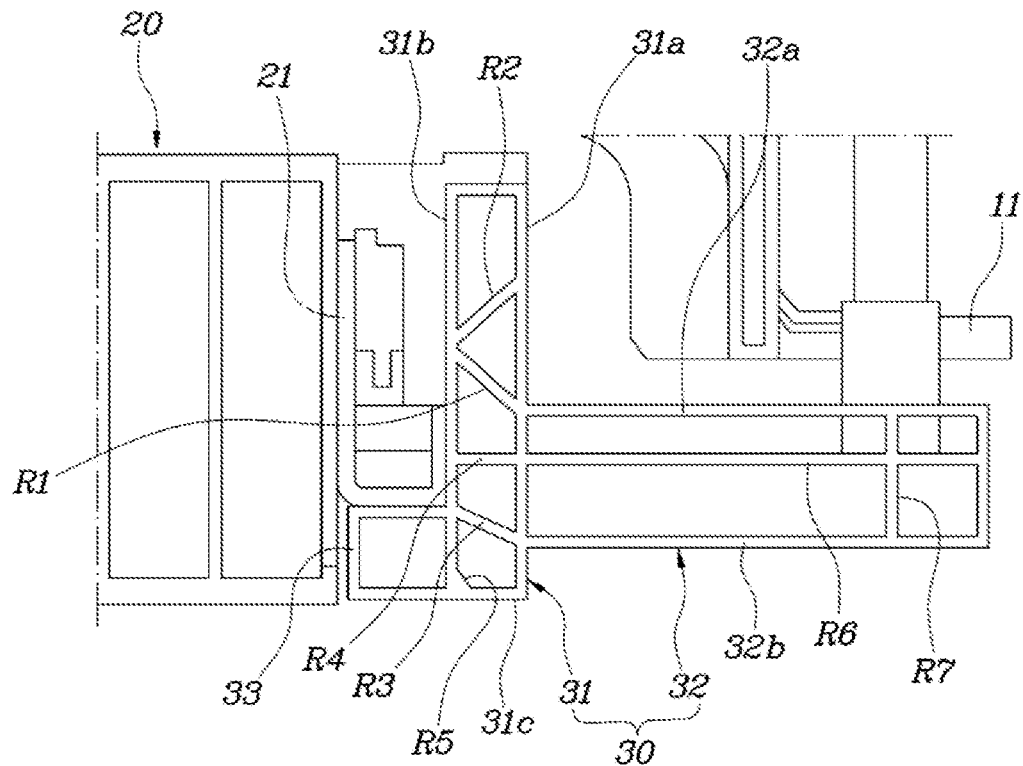
FIG. 2 is a view exemplarily illustrating a side member in a battery case structure for an electric vehicle according to the present disclosure before a side collision.
Figure 3:
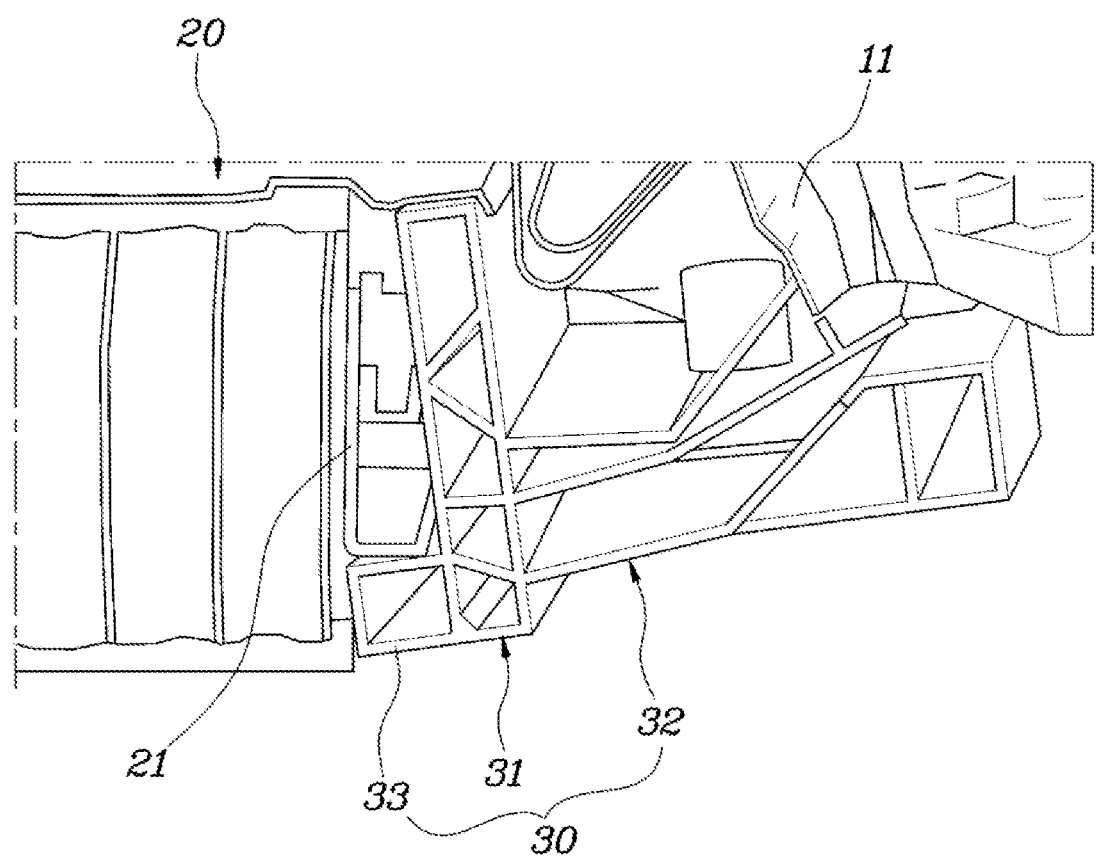
FIG. 3 is a view exemplarily illustrating a side member in a battery case structure for an electric vehicle according to the present disclosure after a side collision.
Figure 4:
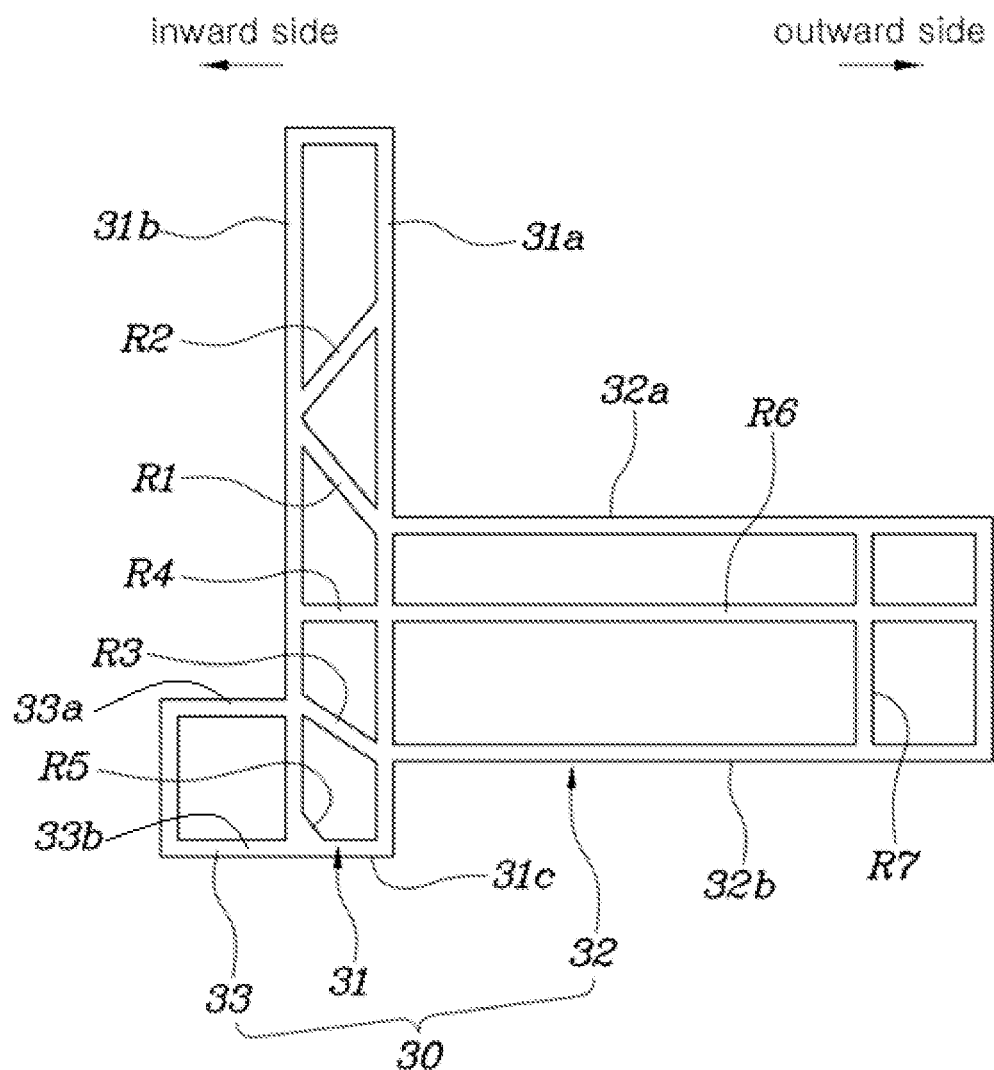
FIG. 4 is a view exemplarily illustrating a side member in a battery case structure for an electric vehicle according to the present disclosure.

FIG. 1 is a view exemplarily illustrating a vehicle body floor and a battery case according to the present disclosure, FIG. 2 is a view exemplarily illustrating a side member in a battery case structure for an electric vehicle according to the present disclosure before a side collision, FIG. 3 is a view exemplarily illustrating a side member in a battery case structure for an electric vehicle according to the present disclosure after a side collision, and FIG. 4 is a view exemplarily illustrating a side member in a battery case structure for an electric vehicle according to the present disclosure As shown in FIG. 1, FIG. 2, FIG. 3, and FIG. 4, the battery case structure for the electric vehicle according to the present disclosure includes a vehicle body floor panel 10 including side sills 11 at both lateral sides thereof; a battery case 20 coupled to a lower portion of the vehicle body floor panel 10; and a side member 30 including a partition 31 coupled to each lateral side of the battery case 20, and a flange 32 extending laterally from the partition 31 and coupled to the side sill 11 of the vehicle body floor panel 10, the partition 31 being internally formed with at least one rib extending transversely.

The vehicle body floor panel 10 forms the floor of the vehicle, and is provided with the side sills 11 at both lateral sides. The fundamental structures of the vehicle body floor panel 10 and the side sill 11 are apparent in the art, and thus detailed descriptions thereof will be omitted.

The battery case 20 holds a high voltage battery therein, and is provided with the side members 30 at both lateral sides. The side members 30 are fastened to the side sills 11 of the vehicle body floor panel 10, so that the battery case 20 may be coupled to the lower portion of the vehicle body floor panel 10. Various wires and electronic parts, such as the high voltage battery placed inside the battery case 20, are apparent in the art, and thus detailed descriptions thereof will be omitted.

The present disclosure relates to the side member 30 for a connection structure between the vehicle body floor panel 10 and the battery case 20, the side member 30 including the partition 31 and the flange 32.

Here, the partition 31 of the side member 30 is coupled to the lateral side of the battery case 20, and the flange 32 extends from the partition 31 and coupled to the vehicle body floor panel 10. The partition 31 is internally formed with at least one rib to secure the rigidity of the partition 31 and prevent an impact caused by a collision from being transferred to the battery as the flange 32 is broken or bent from the partition 31 by the collision.

Like this, according to the present disclosure, the rigidity is secured by the ribs provided in the partition 31 without changing the material of the side member 30 or using a material different from the material of the side member 30, stably protecting the battery as the partition 31 is rigidly supported and the flange 32 is broken or deformed to absorb an impact when a side collision occurs.

In more detail, the partition 31 and the flange 32 of the side member 30 are in a shape of boxes including a closed cross-section. The battery case 20 is provided at an inward side 31b of the partition 31, and the flange 32 is coupled as biased downwards to an outward side 31a of the partition 31.

As shown in FIG. 2, each of the partition 31 and the flange 32 of the side member 30 is shaped like a box including a closed cross-section. Furthermore, the ribs are formed inside the partition 31 and the flange 32 of the side member 30.

Here, the battery case 20 is provided at the inward side 31b of the partition 31, and the flange 32 is coupled to the outward side 31a of the partition 31. The flange 32 is positioned as biased downwards in the partition 31, securing a space so that the side sill 11 of the vehicle body floor panel 10 may be coupled upwards.

Furthermore, the flange 32 is positioned as biased downwards on the outward side 31a of the partition 31, and therefore the flange 32 is guided to be deformed or broken in an upward direction as the vehicle body floor panel 10 provided above the flange 32 is pushed inwards by an impact when a side collision occurs. Accordingly, the flange 32 is deformed or broken to decrease the impact, and the partition 31 with the ribs blocks out the penetration of the impact at the lateral side of the battery case 20 to prevent the direct penetration of the impact into the battery case 20.

Below, the ribs provided in the side member 30 will be described. Each rib of the side member 30 is designed based on the topology optimization technique, allowing the partition 31 and the flange 32 to minimize the transfer of the impact to the battery case 20.

In detail, a first rib R1 is formed inside the partition 31 and extends as inclined upwards from a region of the outward side 31a, to which an upper portion 32a of the flange 32 is connected, to the inward side 31b.

Accordingly, the first rib R1 inside the partition 31 extends as if continued from the upper portion 32a of the flange 32, securing the capability of supporting the flange 32, and improving the rigidity of the partition 31. Furthermore, the supporting capability is secured by extending the first rib R1 as inclined upwards from the upper portion 32a of the flange 32 inwards, minimizing deformation due to load transferred from the flange 32 by a lateral collision.

Furthermore, a second rib R2 is formed inside the partition 31 and extending as inclined upwards from the first rib R1 on the inward side 31b to the outward side 31a.

Accordingly, the second rib R2 inside the partition 31 extends as connected to the first rib R1, reinforcing the rigidity of the partition 31. The second rib R2 extends as inclined upwards from the first rib R1 on the inward side 31b of the partition 31 to the outward side 31a, forming a 'V'-shape together with the first rib R1. In other words, the first rib R1 and the second rib R2 are provided forming a lying 'V'-shape to increase the rigidity for supporting the flange 32 when a collision occurs in the vehicle. Here, the angle between the first rib R1 and the second rib R2 may be formed by securing the maximum angle within an allowable space inside the partition 31, so that the first rib R1 and the second rib R2 can improve an effect on increasing the rigidity.

Furthermore, a third rib R3 is formed inside the partition 31 and extending as inclined upwards from a region of the outward side 31a, to which a lower portion 32a of the flange 32 is connected, to the inward side 31b.

Accordingly, the third rib R3 inside the partition 31 extends as if continued from the lower portion 32b of the flange 32, securing the capability of supporting the flange 32, and improving the rigidity of the partition 31. Furthermore, the supporting capability is secured by extending the first rib R1 as inclined upwards from the lower portion 32b of the flange 32 inwards, minimizing deformation due to load transferred from the flange 32 by a lateral collision Accordingly, the partition 31 is internally provided with the first rib R1 and the third rib R3 respectively matching the upper portion 32a and the lower portion 32b of the flange 32, so that the rigidity of the partition 31 and the rigidity for supporting the flange 32 may be secured to thereby prevent an impact due to a lateral collision from penetrating the battery.

Furthermore, a supporter 33 is formed in a lower portion of the partition 31 and protrudes from the inward side 31b toward the battery case 20.

The supporter 33 is accommodated at a lower portion of the battery case 20, and the partition 31 and the supporter 33 are formed to surround a lateral portion 21 of the battery case 20, more strongly protecting the battery case 20. Furthermore, the rigidity of the side member 30 is further secured by the supporter 33 formed in the lower portion of the partition 31, so that the flange 32 may be guided to be deformed or broken upwards by a lateral collision, avoiding an impact being transferred to the battery.

As shown in FIG. 4, the supporter 33 is positioned so that the lateral portion 21 of the battery case 20 may be accommodated thereon, and includes an upper portion 33a matching and connecting with the third rib R3, and a lower portion 33b matching and connecting with a bottom portion 31c of the partition 31.

Accordingly, the supporter 33 extends from the lower portion of the partition 31 to a lower side of the lateral portion 21 of the battery case 20, and positioned so that the lateral portion 21 of the battery case 20 may be accommodated thereon, forming a shape to surround the battery case 20. Furthermore, the supporter 33 is formed to have the upper portion matching the third rib R3 of the partition 31 and the lower portion matching the bottom portion 31c of the partition 31, strengthening the structure for connecting with the partition 31. With the present structure, the load transferred from the flange 32 is effectively supported by the partition 31 and the supporter 33, decreasing the impact transferred to the battery case 20 when a collision occurs.

Furthermore, a fifth rib R5 is formed inside the partition 31 and connects the inward side 31b and the bottom portion 31c. The fifth rib R5 may have a triangular shape while connecting the inward side 31b and the bottom portion 31c of the partition 31. The connection between the inward side 31b and the bottom portion 31c of the partition 31 strengthens the rigidity against the load transferred through the flange 32.

Furthermore, a sixth rib R6 is formed inside the flange 32 and extends to traverse the flange 32 laterally, and a fourth rib R4 is formed inside the partition 31 and extends on the same line as the sixth rib R6.

Accordingly, the sixth rib R6 laterally extends inside the flange 32, securing the rigidity against a lateral collision. Furthermore, the fourth rib R4 is formed inside the partition 31 and extends on the same line as the sixth rib R6, together with the sixth rib R6, securing the capability of supporting the lateral load.

Accordingly, the partition 31 includes the first rib R1 matching the upper portion 32a of the flange 32, the third rib R3 matching the lower portion 32b of the flange 32, and the fourth rib R4 matching the sixth rib R6 of the flange 32, and therefore secures the supporting capability and the rigidity against the load transferred through the flange 32 when a collision occurs in the vehicle, protecting the battery by preventing an impact from penetrating into the battery.

Meanwhile, the sixth rib R6 laterally extends across the inside of the flange 32 to divide the inside of the flange 32 into an upper space and a lower space, and positioned so that the vertical height of the upper space may be smaller than the vertical height of the lower space.

Due to the structural characteristics of vehicle design, the vehicle body floor panel 10 and the battery case 20 are provided at a lower side of a vehicle, and impact load is applied to an upper side of the flange when a side collision occurs. Therefore, the rigidity of the flange 32 is reinforced by the sixth rib R6, and the upper space of the flange 32 is designed to secure higher rigidity than the lower portion 32b because the upper space of the flange 32 is formed to be narrower than the lower space.

In an exemplary embodiment of the present invention, the upper portion of the supporter 33 is positioned higher than the lower portion 32b of the flange 32.

Meanwhile, a seventh rib R7 is formed inside the flange 32 and extends to traverse the inside of the flange 32 vertically. The seventh rib R7 is positioned in a region where the side sill 11 of the vehicle body floor panel 10 is connected. Accordingly, the flange 32 includes the seventh rib R7 vertically extending in the region, to which the side sill 11 of the vehicle body floor panel 10 is connected so that coupling rigidity between the side sill 11 and the flange 32 may be secured. Furthermore, the flange 32 has relatively low rigidity in a region other than the seventh rib R7, therefore may be broken or damaged in the region by absorbing an impact while maintaining the coupling with the side sill 11.

With the foregoing structure of the battery case 20 for the electric vehicle, the flange 32 of the side member 30 laterally provided in the battery case 20 is deformed or broken from the partition 31 to absorb an impact when a side collision occurs, minimizing the impact which is caused by the collision and is provided to penetrate the battery. Furthermore, the partition 31 of the side member 30 is designed based on the topology optimization to secure rigidity, protecting the battery against the impact.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery case structure for a vehicle, the battery case structure comprising:
    a vehicle body floor panel including side sills at first and second lateral sides of the vehicle body floor panel;
    a battery case coupled to a lower portion of the vehicle body floor panel; and
    a side member including a partition coupled to each lateral side of the battery case, and a flange extending laterally from the partition and coupled to the side sills of the vehicle body floor panel, the partition being internally formed with at least one rib extending transversely,
    wherein the at least one rib includes a third rib formed inside the partition and extending as inclined upwards from a region of an outward side, to which a lower portion of the flange is connected, to the inward side of the partition,
    wherein a supporter is formed in a lower portion of the partition and protrudes from an inward side toward the battery case, and
    wherein the supporter is positioned so that a lateral portion of the battery case is accommodated on the supporter, and includes an upper portion connecting and matching the third rib and a lower portion connecting and matching a bottom portion of the partition.

2. The battery case structure of claim 1, wherein the partition and the flange of the side member are in a shape of boxes including a closed cross-section, the battery case is provided at the inward side of the partition, and the flange is coupled downwardly and on the outward side of the partition.

3. The battery case structure of claim 2, wherein the at least one rib further includes a first rib formed inside the partition and extending as inclined upwards from a region of the outward side, to which an upper portion of the flange is connected, to the inward side of the partition.

4. The battery case structure of claim 3, wherein the at least one rib further includes a second rib formed inside the partition and extending as inclined upwards from the first rib on the inward side to the outward side of the partition.

5. The battery case structure of claim 4, wherein the second rib and the first rib form a 'V'-shape therebetween.

6. The battery case structure of claim 1, wherein the upper portion of the supporter is positioned higher than the lower portion of the flange.

7. The battery case structure of claim 2, wherein the at least one rib further includes a fifth rib formed inside the partition and connecting the inward side and the bottom portion of the partition.

8. The battery case structure of claim 2, wherein the at least one rib further includes a sixth rib formed inside the flange and extending to traverse the flange laterally.

9. The battery case structure of claim 8, wherein the at least one rib further includes a fourth rib formed inside the partition and extending on a same line as the sixth rib to the inward side of the partition.

10. The battery case structure of claim 9, wherein the sixth rib laterally extends across the inside of the flange to divide the inside of the flange into an upper space and a lower space, and is positioned so that the upper space is formed to have a smaller vertical height than a vertical height of the lower space.

11. The battery case structure of claim 10, wherein the at least one rib further includes a seventh rib formed extendedly to traverse vertically inside the flange.

12. The battery case structure of claim 11, wherein the seventh rib is positioned in a region where the side sills of the vehicle body floor panel is connected.

13. The battery case structure of claim 9, wherein the at least one rib further includes:
    a first rib formed inside the partition and extending as inclined upwards from a region of the outward side, to which an upper portion of the flange is connected, to the inward side; and a third rib formed inside the partition and extending as inclined upwards from a region of the outward side, to which a lower portion of the flange is connected, to the inward side, wherein the fourth rib is positioned between the first rib and the third rib.

\* \* \* \* \*